United States Patent [19]

Mizumoto et al.

[11] Patent Number: 5,053,287
[45] Date of Patent: Oct. 1, 1991

[54] MAGNETOOPTICAL RECORDING MEDIA AND PROCESSES FOR PRODUCTION THEREOF

[75] Inventors: Kunihiko Mizumoto, Yamaguchi; Hirokazu Kejiura, Ootake; Yuji Togami; Nobuo Saito, both of Tokyo, all of Japan

[73] Assignees: Mitsui Petrochemical Industries, Ltd.; Nippon Hoso Kyokai, both of Tokyo, Japan

[21] Appl. No.: 518,304

[22] Filed: May 1, 1990

Related U.S. Application Data

[63] Continuation of Ser. No. 199,036, filed as PCT JP87/00620 on Aug. 21, 1987, published as WO88/01425 on Feb. 25, 1988, abandoned.

[30] Foreign Application Priority Data

| Aug. 22, 1986 | [JP] | Japan | 61-196688 |
| Aug. 22, 1986 | [JP] | Japan | 61-296689 |
| Feb. 3, 1987 | [JP] | Japan | 62-2384 |
| Feb. 3, 1987 | [JP] | Japan | 62-23835 |

[51] Int. Cl.$^5$ ............................ G11B 5/62; G11B 5/84
[52] U.S. Cl. ...................................... 428/694; 428/900
[58] Field of Search ................................ 428/694, 900

[56] References Cited

U.S. PATENT DOCUMENTS

| 4,612,068 | 9/1986 | Tanaka | 420/83 |
| 4,695,514 | 9/1987 | Takahashi et al. | 428/694 |
| 4,734,344 | 3/1988 | Matsushima et al. | 428/694 |
| 4,814,053 | 3/1989 | Shimokawato | 420/83 |
| 4,838,962 | 6/1989 | Takayama et al. | 420/83 |

FOREIGN PATENT DOCUMENTS

| 034744 | 2/1986 | Japan . |
| 165847 | 7/1986 | Japan . |
| 012941 | 1/1987 | Japan . |
| 043847 | 2/1987 | Japan . |
| 047090 | 2/1987 | Japan . |
| 047846 | 3/1987 | Japan . |
| 100767 | 5/1987 | Japan . |

Primary Examiner—Merrell C. Cashion, Jr.
Attorney, Agent, or Firm—Sherman & Shalloway

[57] ABSTRACT

Magnetooptical recording media according to the present invention are disclosed. By virtue of comprising films of Nd-Dy-Co, Nd-M-Fe or Nd-M-Fe-Co alloy system (in which M denotes Tb, Dy or Ho) having a magnetic easy axis perpendicular to the film, the present magnetooptical recording media have such advantages that there is not any fear of lowering magnetic properties owing to the oxidation of the alloy films, and that there is no need of heating substrates when said alloy films are intended to be formed on the substrates. Accordingly, these alloy films can be formed even on such substrates composed of organic materials such as plastics. Moreover, magnetooptical recording media which comprise the alloy films in accordance with the present invention have excellent magnetic properties such as perpendicular magnetic, anisotropic energy in direction normal to the film, coercive force and saturation magnetization, particularly in point of coercive force.

24 Claims, 1 Drawing Sheet

MAGNETOOPTICAL RECORDING MEDIA AND PROCESSES FOR PRODUCTION THEREOF

No. 07/199,036 filed as PCT JP87/00620 on Aug. 21, 1987, published as WO88/01425 on Feb. 25, 1988, now abandoned.

FIELD OF THE INVENTION

This invention relates to magnetooptical recording media and processes for production thereof, and more particularly to magnetooptical recording media comprising films of amorphous alloy having a magnetic easy axis perpendicular to the film and processes for production thereof.

BACKGROUND OF THE INVENTION

It is known that amorphous films composed of alloys consisting of transition metals, such as iron and cobalt, and rare earth elements, such as terbium (Tb) and gadolinium (Gd), have a magnetic easy axis perpendicular to the film and are capable of forming a small inverse magnetic domain with magnetization anti-parallel to the magnetization of the film. By corresponding the existence or nonexistence of this inverse magnetic domain to "1" or "0", it becomes possible to record a digital signal on such amorphous films as mentioned above.

As amorphous films composed of transition metals and rare earth elements which are used as magnetooptical recording media, there is disclosed an amorphous film of Tb—Fe alloy system containing 15-30 atom % of Tb, for example, in Japanese Patent Publication No. 20691/1982. Tb, used in this amorphous film, is classified among so-called heavy rare earth elements in the rare earth elements. Magnetooptical recording media comprising alloys composed of such heavy rare earth elements as mentioned above and transition metals such as iron and cobalt have been widely investigated.

However, no extensive researches have been made on magnetooptical recording media comprising alloys composed of so-called light rare earth elements such as europium (Eu) and the like which equally belong to the class of rare earth element, and transition metals. For instance, J. Appl. Phys. 57 3906 (1985) barely contains a technical report on such magnetooptical recording media of the type as referred to above, said report disclosing that amorphous films of Nd—Fe alloy system and Nd—Fe—Co alloy system are usable as magnetooptical recording media. Great hopes are entertained of magnetooptical recording media comprising amorphous films of Nd—Fe or Nd—Fe—Co alloy system since Nd is relatively inexpensive and, at the same time, the recording media have large kerr-rotation angle θK and have excellent readout performance (C/N ratio).

In the amorphous films of Nd—Fe or Nd—Fe—Co alloy system referred to above, however, there was involved such a problem that no films with a magnetization with easy axis perpendicular to the film can be formed unless a substrate on which the films are to be formed is heated at the time of forming said films. (See, for example, MAG-51-91p17 (1985), a research material by a society for the study of magnetics, the Electric Society of Japan.) Accordingly, if no films with a magnetization with easy axis perpendicular to the film can be formed on a substrate unless said substrate is heated, it follows that no films with a magnetization with easy axis perpendicular to the film can be formed on a substrate composed of an organic materials poor in heat resistance, such as plastics.

These amorphous films of Nd—Fe or Nd—Fe—Co alloy system were further desired to be improved in magnetic anisotropic energy in direction normal to the film Ku, coercive force Hc and saturation magnetization Ms, though said films have excellent magnetic characteristics.

In the amorphous films of Nd—Fe or Nd—Fe—Co alloy system, moreover, there was involved such problem that there is a fear of lowering magnetic properties of the films owing to oxidation of said films because they contain Fe as one of constituent components thereof.

Japanese Patent L-O-P Publication No. 165847/1986 discloses magnetooptical recording media comprising films of alloy composed of at least one light rare earth metal selected from among Sm, Nd, Pr and Ce, at least one transition metal selected from among Fe, Ni and Co, and at least one heavy rare earth metal selected from among Tb, Gd and Dy, said films being represented by the composition formula $[(Sm, Nd, Pr, Ce)_{1-x}(Tb, Gd, Dy)_x]_y(Fe, Co, Ni)_{1-y}$ wherein $0 < x \leq 0.5$ and $0.1 \leq y \leq 0.4$. This publication discloses as an example a magnetooptical recording media comprising a film represented by the composition formula $(Nd_xDy_{1-x})_{0.25}Fe_{0.75}$.

In Japanese Patent L-O-P Publication No. 165847/1986 referred to above, however, there is disclosed concretely only Nd—Dy—Fe type magnetooptical recording medium. In this connection, the present inventors have found that the recording media disclosed in the said publication involve such a serious problem that there is a fear of disappearance of the information recorded on said recording media when they are particularly of Nd—Dy—Co type having the composition falling within the abovementioned range since the resulting films are small in coercive force, though they have satisfactory values of kerr-rotation angle, and consequently are adversely affected by external magnetic field.

As a result of extensive researches conducted with a view of solving the above-mentioned problems at a stroke, the present inventors have finally found that these problems can be solved in magnetooptical recording media comprising amorphous films of Nd—Fe or Nd—Fe—Co alloy system having been further incorporated with specific amounts of specific heavy rare earth elements, or in magnetooptical recording media comprising novel amorphous films of Nd—Dy—Co alloy system. Thus, the present invention has been accomplished on the bases of the above finding.

The present invention is intended to solve such problems associated with the prior art as mentioned above, and an object thereof is to provide magnetooptical recording media comprising amorphous films of alloy and processes for producing the same, which amorphous films of alloy have no fear of lowering magnetic characteristics owing to oxidation of said films, are capable of forming a film with a magnetization with easy axis perpendicular to the film having excellent magnetic properties on a substrate even without heating the substrate, and are excellent in coercive force.

DISCLOSURE OF THE INVENTION

A first magnetooptical recording medium of the present invention is characterized in that said recording medium comprises a film of Nd—Dy—Co alloy system having a magnetic easy axis perpendicular to the film and when the composition of said film is represented by $Nd_xDy_yCo_z$, $x/x+y+z$ (atomic ratio) is 0.01–0.2, $y/x+y+z$ (atomic ratio) is 0.1–0.3, and $x/y$ (atomic ratio) is less than 1.

A second magnetooptical recording medium of the present invention is characterized in that said recording medium comprises a film of Nd—M—Fe alloy system (in which M denotes Tb, Dy or Ho) having a magnetic easy axis perpendicular to the film and when the composition of said film is represented by $Nd_xM_yFe_z$, $x/z$ (atomic ratio) is less than 0.5, $y/x+y+z$ (atomic ratio) is 0.1–0.3, and $x/y$ (atomic ratio) is less than 1.

A third magnetooptical recording medium of the present invention is characterized in that said recording medium comprises a film of Nd—M—Fe—Co alloy system (in which M denotes Tb, Dy or Ho) having a magnetic easy axis perpendicular to the film and when the composition of said film is represented by $Nd_xM_yFe_zCo_m$, $x/z+m$ (atomic ratio) is less than 0.5, $y/x+y+z+m$ (atomic ratio) is 0.1–0.3, and $x/y$ (atomic ratio) is less than 1.

The processes for producing the magnetooptical recording media of the present invention are characterized by depositing on a substrate while maintaining it at a temperature below 150° C. such films of Nd—Dy—Co alloy system or films of Nd—M—Fe alloy system as mentioned above, or films of Nd—M—Fe—Co alloy system (in which M denotes Tb, Dy or Ho).

Since the magnetooptical recording media of the present invention comprise films of Nd—Dy—Co alloy system having a specific composition, those of Nd—M—Fe alloy system having a specific composition, or those of Nd—M—Fe—Co alloy system having a specific composition, there is no fear of lowering magnetic properties owing to oxidation of said films, and there is no necessity of heating a substrate at the time of depositing said films thereon. Accordingly, it becomes possible to form these alloy films even on a substrate composed of organic material such as plastics. Moreover, the magnetooptical recording media comprising films of alloy according to the present invention have excellent magnetic properties such as magnetic antisotropic energy in direction normal to the film, coercive force and saturation magnetization, particularly coercive force.

BEST MODE OF PRACTICING THE INVENTION

Figure 1:
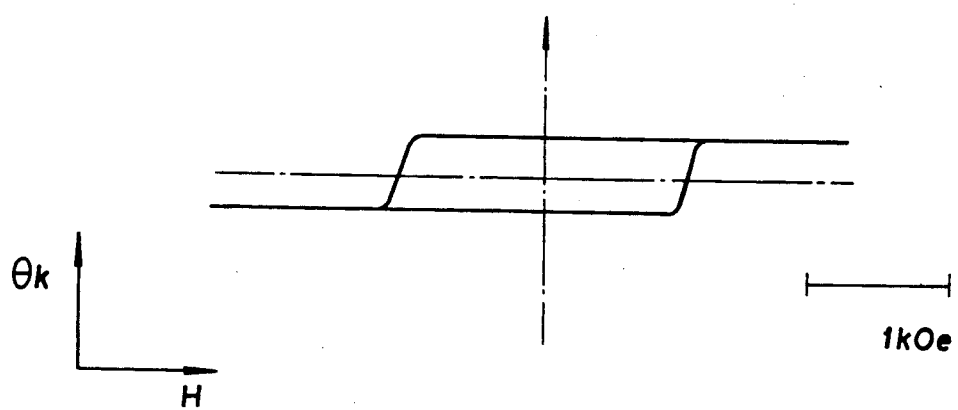
FIGS. 1 and 2 show Kerr hysteresis loops of the magnetooptical recording media of the present invention.
Figure 2:
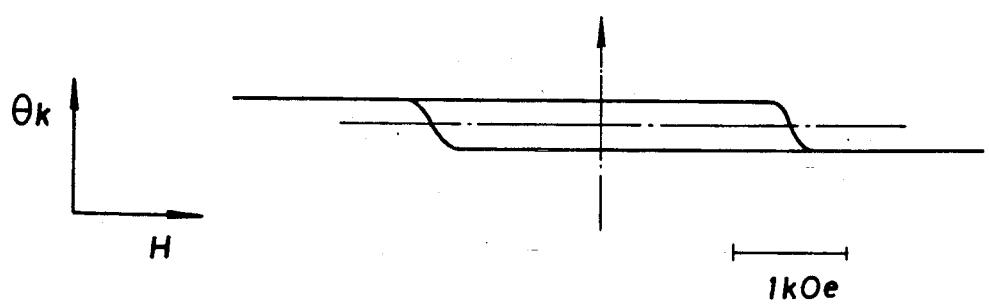

The magnetooptical recording media of the present invention and processes for producing the same are illustrated below in detail.

The first magnetooptical recording medium of the present invention comprises a film of Nd—Dy—Co alloy system having a magnetic easy axis perpendicular to the film.

By incorporating Dy into a film with a magnetization with easy axis perpendicular to the film composed of Nd—Co alloy system, it is not necessary to heat a substrate at the time of forming this film thereon and hence said film can be formed on the substrate even at a temperature of about room temperature.

Furthermore, when Dy is incorporated into Nd—Co alloy system, a magnetic anisotropic energy in direction normal to the film Ku of the film with a magnetization with easy axis perpendicular to the film obtained thereby becomes large and, at the same time, saturation magnetization Ms becomes small, and moreover, a coercive force Hc becomes large, whereby it becomes possible that a small magnetic domain can stably exist therein. For this reason, it becomes possible to use this film with a magnetization with easy axis perpendicular to the film as a compensation temperature recording material and perform a high density magnetic recording.

When the composition of the film of Nd—Dy—Co alloy system is represented by $Nd_xDy_yCo_z$, the content of Nd, i.e. $x/x+y+z$ (atomic ratio) is 0.01–0.2, preferably 0.05–0.18, the content of Dy, i.e. $y/x+y+z$ (atomic ratio) is 0.1–0.3, and an atomic ratio of Nd to Dy, i.e. $x/y$ (atomic ratio) is less than 1.

When a film of Nd—Dy—Co alloy system having the composition falling within the above-mentioned range, there is obtained the film with a magnetization with easy axis perpendicular to the film which exhibits a favorable square-shaped Kerr hysteresis loop and which is excellent in coercive force.

Under certain circumstances, moreover, the film of Nd—Dy—Co alloy system can be incorporated with other heavy rare earth element as a fourth component. Useful heavy rare earth elements for this purpose are Gd, Tb, Ho or the like. By the incorporation of the heavy rare earth element, it becomes possible to control Curie temperature (Tc) and compensation temperature (Tcomp).

Under certain circumstances, furthermore, the film of Nd—Dy—Co alloy system can be incorporated with such a metal as Ti, Cr or the like as a fourth component, and by the incorporation of such metal, it becomes possible to improve the alloy film in corrosion resistance.

The second magnetooptical recording medium of the present invention comprises a film of Nd—M—Fe alloy system (in which M denotes Tb, Dy or Ho) having a magnetic easy axis perpendicular to the film.

By incorporating a film with a magnetization with easy axis perpendicular to the film composed of the Nd—Fe alloy system with Tb, Dy or Ho, there is no necessity of heating a substrate at the time of depositing this film thereon and said film can be formed on the substrate even at a temperature of about room temperature.

When a specific amount of Tb, Dy or Ho is incorporated into the Nd—Fe alloy system, a magnetic anisotropic energy in direction normal to the film Ku of the film with a magnetization with easy axis perpendicular to the film obtained thereby becomes large and, at the same time, saturation magnetization becomes small, and, moreover, a coercive force Hc becomes large, whereby it becomes possible that a small magnetic domain can stably exist therein. For this reason, it becomes possible to perform a high density magnetic recording on this film with a magnetization with easy axis perpendicular to the film.

When the composition of this film of Nd—M—Fe alloy system is represented by $Nd_xM_yFe_z$, $x/z$, i.e. Nd/Fe (atomic ratio) is less than 0.5, preferably 0.1–0.4, $y/x+y+z$ (atomic ratio), i.e. the content of M is 0.1–0.3, and $x/y$ (atomic ratio), i.e. an atomic ratio of Nd to M, is less than 1. If $x/y$ (atomic ratio) is more than 1, the coercive force of the magnetooptical recording medium is as small as 1 KOe or less, and there is brought about such a serious problem that there is a fear of disappearance of the information recorded because of the influence of external magnetic field.

When M is Dy or Ho, $x/x+y+z$ (atomic ratio), i.e. the content of Nd, is preferably 0.1-0.4, and when M is Tb, $x/x+y+z$ (atomic ratio), i.e. the content of Nd, is preferably 0.05-0.3.

When the film of Nd—M—Fe alloy system having the composition falling within the above-mentioned range is formed, its Kerr hysteresis loop exhibits favorable square-shape and, at the same time, a film with a magnetization with easy axis perpendicular to the film excellent in coercive force is obtained.

The third magnetooptical recording medium of the present invention comprises a film of Nd—M—Fe—Co alloy system (in which M denotes Tb, Dy or Ho) having a magnetic easy axis perpendicular to the film.

By incorporating Co into the film of Nd—M—Fe alloy system, it becomes possible to make large kerr-rotation angle $\theta K$ of the film obtained thereby.

Similarly to the case of the film of Nd—M—Fe alloy system, this film of Nd—M—Fe—Co alloy system can be deposited on a substrate without heating the substrate at the time of forming said film thereon, even at a temperature of about room temperature.

When the composition of this film of Nd—M—Fe—Co alloy system is represented by $Nd_xM_yFe_zCo_m$, $x/z+m$, i.e. Nd/Fe+Co (atomic ratio), is less than 0.5, and $y/x+y+z+m$, i.e. the content of M, is 0.1-0.3. Furthermore, $x/y$ (atomic ratio), an atomic ratio of Nd to M, is less than 1. If $x/y$ (atomic ratio) is more than 1, the coercive force of the magnetooptical recording medium is as small as 1 KOe or less, and there is brought about such a serious problem that there is a fear of disappearance of the information recorded because of the influence of external magnetic field exerted thereon.

Furthermore, when M is Dy or Ho, $x/x+y+z+m$ (atomic ratio), i.e. the content of Nd, is preferably 0.1-0.4, and when M is Tb, $x/x+y+z+m$, i.e., the content of Nd, is preferably 0.05-0.3.

When the film of Nd—M—Fe—Co alloy system having the composition having the above-mentioned range is formed, the resulting film exhibits Kerr hysteresis loop of a favorable square-shaped form.

When Tb, Dy or Ho is incorporated in the specific amount as mentioned above into the Nd—Fe—Co alloy system, a magnetic anisotropic energy in direction normal to the film Ku of the resulting film with a magnetization with easy axis perpendicular to the film becomes large and, at the same time, saturation magnetization Ms becomes small and, moreover, coercive force Hc becomes large, whereby a small magnetic domain comes to stably exist therein. For this reason, it becomes possible to perform a high density magnetic recording on this film with a magnetization with easy axis perpendicular to the film.

In the present specification, whether Kerr hysteresis loop (under external magnetic field up to 10 $KO_e$, with magnetic field sweep frequency 0.04 Hz) exhibits favorable square-shape or not is determined in the following manner. When Kerr hysteresis loop of the magnetooptical medium of the present invention is schematically illustrated, if a ratio $\theta k_2/\theta k_1$ of the kerr-rotation angle at a saturation magnetization ($\theta k_1$) in the maximum external magnetic field to the kerr-rotation angle at a remanent magnetization ($\theta k_2$) in the external magnetic field of zero is more than 0.8, the Kerr hysteresis loop is determined to exhibit favorable square-shape, and if the $\theta k_2/\theta k_1$ ratio is less than 0.8, the shape of loop is determined to be poor.

The processes for producing the magnetooptical recording media of the present invention are illustrated below.

In the processes of the present invention, temperature of the substrate is maintained at below 150° C., if necessary at 20°-30° C., and such film of Nd—Dy—Co alloy system as mentioned above, or such film of Nd—M—Fe or Nd—M—Fe—Co system (in which M denotes Tb, Dy or Ho) is deposited on the substrate. In depositing such films as mentioned above, there can be adopted the conventionally known film depositing methods, such as sputtering, electron beam evaporation or the like methods.

In accordance with the present invention as described in the manner above, a film with a magnetization with easy axis perpendicular to the film composed of a film of Nd—Dy—Co, Nd—M—Fe or Nd—M—Fe—Co alloy system can be formed on a substrate even at a temperature of the substrate maintained at below 150° C., if necessary, at about 20°-30° C. The film with a magnetization with easy axis perpendicular to the film, therefore, can be formed even on a substrate composed of an organic material such as plastics typified by polycarbonates, polyacryl or epoxy. Furthermore, in the present invention, if a heat resistant substrate is used, such films with a magnetization with easy axis perpendicular to the film as mentioned above can be formed even with heating the substrate.

In depositing the film with a magnetization with easy axis perpendicular to the film on the substrate by the sputtering method, it is preferable to positively cool the substrate to maintain temperature of the substrate at below 150° C., if necessary at about 20°-30° C., by means of water or the like in the usual way.

At the time of sputtering, a negative bias voltage can be applied to the substrate so that the substrate has negative potential. When the substrate is treated in this manner, accelerated ions of inert gas such as argon come to hit not only a target substance but also a film with a magnetization with easy axis perpendicular to the film being formed, and the film with a magnetization with easy axis perpendicular to the film having excellent properties is sometimes obtained.

EFFECT OF THE INVENTION

Since the magnetooptical recording media of the present invention comprise films of Nd—Dy—Co, Nd—M—Fe or Nd—M—Fe—Co alloy system having a specific composition and having a magnetic easy axis perpendicular to the film, there is no fear of lowering magnetic properties owing to oxidation of said films and there is no necessity of heating a substrate at the time of depositing the films thereon, and accordingly said films can also be formed even on a substrate composed of an organic material such as plastics. Moreover, magnetooptical recording media comprising the alloy films of the present invention are excellent in such magnetic properties as magnetic anisotropic energy in direction normal to the film, coercive force and saturation magnetization, particularly coercive force.

The present invention is illustrated below with reference to examples, but it should be construed that the invention is in no way limited to those examples.

EXAMPLE 1

Using a composite target with chips of Nd and Dy arranged in a predetermined proportion on Co target as a target, there was deposited on a glass substrate a film with a magnetization with easy axis perpendicular to the film composed of an Nd—Dy—Co ternary alloy film. The film was formed on the substrate maintained at 20°-30° C. by cooling it with water, while adopting the magnetron sputtering method under argon pressure of 1 m Torr.

As a result, the film having quite excellent magnetooptical characteristics was obtained.

Composition of film ... $Nd_{11}Dy_{26}Co_{63}$ (atomic ratio)
Coercive force Hc ... 1.0 KOe
kerr-rotation angle $\theta k$ ... 0.28°
Square-shape of Kerr hysteresis loop ... Favorable The composition of film was determined by means of ICP emission spectroscopic analysis, and the kerr-rotation angle was measured at a remanent mangetization from the side of the glass substrate.

FIG. 1 shows the Kerr hysteresis loop.

EXAMPLES 2-5

Following substantially the same procedure as described in Example 1, Nd—Dy—Co ternary alloy films different in composition were deposited on substrates. Composition of each of the films as obtained and magnetooptical characteristics thereof are shown in Table 1.

TABLE 1

| Example | Composition of film | Hc (KOe) | $\theta k$ (°) | Square-shape of Kerr hysteresis |
|---|---|---|---|---|
| 2 | $Nd_9Dy_{23}Co_{68}$ | 0.7 | 0.23 | o |
| 3 | $Nd_{11}Dy_{20}Co_{69}$ | 0.7 | 0.18 | o |
| 4 | $Nd_{12}Dy_{22}Co_{67}$ | 1.2 | 0.20 | o |
| 5 | $Nd_6Dy_{26}Co_{68}$ | 0.9 | 0.19 | o |

COMPARATIVE EXAMPLES 1-2

Nd—Dy—Co ternary alloy films having the composition as mentioned below were deposited on the substrates in substantially the same manner as in Example 1. Composition of each of the film as obtained and magnetooptical characteristics thereof are shown in Table 2.

TABLE 2

| Comparative Example | Composition of film | Hc (KOe) | $\theta k$ (°) | Square-shape of Kerr hysteresis |
|---|---|---|---|---|
| 1 | $Nd_{21}Dy_{24}Co_{55}$ | 0.1 | 0.01 | x |
| 2 | $Nd_{13}Dy_{31}Co_{56}$ | 0.2 | 0.02 | x |

In comparative Example 1, $x/x+y+z$ (atomic ratio), i.e. the content of Nd, is more than 0.2, and hence a disturbance was observed in square-shaped Kerr hysteresis loop. In Comparative Example 2, $y/x+y+z$ (atomic ratio), i.e. the content of Dy, is more than 0.3, and hence a disturbance was observed in square-shaped Kerr hysteresis loop.

COMPARATIVE EXAMPLE 3

Using a composite target with chips of Nd arranged in the predetermined proportion on Co target as a target, Nd—Co alloy film was deposited on a glass substrate maintained at 20°-30° C. by cooling it with water in substantially the same manner as in Example 1.

It was confirmed using a vibrating sample magnetometer (VSM) that in the Nd—Co alloy film, the magnetic easy axis was parallel to the film surface.

The results obtained are shown in Table 3.

TABLE 3

| Comparative Example | Composition of film | Hc (KOe) | $\theta k$ (°) | Square-shape of Kerr hysteresis |
|---|---|---|---|---|
| 3 | $Nd_{20}Co_{80}$ | — | — | x |

EXAMPLE 6

Using a composite target with chips of Nd, Tb and Co arranged in the predetermined proportion on Fe target as a target, a film with a magnetization with easy axis perpendicular to the film composed of an Nd—Tb—Fe—Co quaternary alloy film was deposited on a glass substrate. The film was formed on the substrate maintained at 20°-30° C. by cooling it with water while applying a bias voltage of −30 V to the substrate and adopting the sputtering method under argon pressure of 10 m Torr.

As a result, the film having quite excellent magnetooptical characteristics mentioned below was obtained.

Composition of film ... $Nd_{19}Tb_{21}Fe_{43}Co_{18}$ (atomic ratio)
Coercive force Hc ... 1.4 KOe
kerr-rotation angle $\theta k$ ... 0.26°
Square-shape of Kerr hysteresis loop ... Favorable The composition of film was determined by means of ICP emission spectroscopic analysis, and the kerr-rotation angle was measured at a remanent magnetization from the side of the glass substrate.

EXAMPLES 7-8

Following substantially the same procedure as described in Example 6, Nd—Tb—Fe—Co quaternary alloy films different in composition were deposited on substrates. Composition of each of the films obtained and magnetooptical characteristics thereof are shown in Table 4.

COMPARATIVE EXAMPLES 4-5

Following substantially the same procedure as described in Example 6, Nd—Tb—Fe—Co quaternary films different in composition, x/y (atomic ratio) of which is larger than 1, were deposited on substrates. Composition of each of the films obtained and magnetooptical characteristics thereof are shown in Table 4.

TABLE 4

| | Composition of film | Hc (KOe) | $\theta k$ (°) | Square-shape of Kerr hysteresis |
|---|---|---|---|---|
| Example 7 | $Nd_{19}Tb_{22}Fe_{43}Co_{16}$ | 3.90 | 0.21 | o |
| Example 8 | $Nd_{19}Tb_{23}Fe_{44}Co_{14}$ | 1.52 | 0.20 | o |
| Comparative Example 4 | $Nd_{19}Tb_{14}Fe_{49}Co_{18}$ | 0.48 | 0.32 | o |
| Comparative Example 5 | $Nd_{19}Tb_{17}Fe_{46}Co_{18}$ | 0.61 | 0.29 | o |

COMPARATIVE EXAMPLES 6-7

Following substantially the same procedure as described in Example 6, Nd—Tb—Fe—Co quaternary alloy films different in composition, x/y (atomic ratio) of which is larger than 1, were deposited on substrates. In this connection, no bias voltage was applied.

Composition of each of the films obtained and magnetooptical characteristics thereof are shown in Table 5.

TABLE 5

| Comparative Example | Composition of film | Hc (KOe) | $\theta k$ (°) | Square-shape of Kerr hysteresis |
| --- | --- | --- | --- | --- |
| 6 | $Nd_{22}Tb_{15}Fe_{45}Co_{18}$ | 0.41 | 0.26 | ○ |
| 7 | $Nd_{22}Tb_{17}Fe_{43}Co_{18}$ | 0.36 | 0.20 | ○ |

COMPARATIVE EXAMPLES 8-9

Nd—Tb—Fe—Co quaternary alloy films were deposited on substrates in the same manner as in Example 6 so that Nd/Fe+Co > ½ is attained.

Composition of each of the films obtained and magnetooptical characteristics thereof are shown in Table 6.

TABLE 6

| Comparative Example | Composition of film | Hc (KOe) | $\theta k$ (°) | Square-shape of Kerr hysteresis |
| --- | --- | --- | --- | --- |
| 8 | $Nd_{28}Tb_{17}Fe_{39}Co_{16}$ | 0.32 | 0.14 | x |
| 9 | $Nd_{30}Tb_{24}Fe_{32}Co_{14}$ | 0.30 | 0.12 | x |

In the above cases, Kerr hysteresis loop did not exhibit favorable square-shap.

COMPARATIVE EXAMPLE 10

Following substantially the same procedure as described in Example 6, Nd—Tb—Fe—Co quaternary alloy film in which Tb/Nd+Tb+Fe+Co is larger than 0.3 was deposited on a substrate.

Composition of the film obtained and magnetooptical characteristics thereof are shown in Table 7.

TABLE 7

| Comparative Example | Composition of film | Hc (KOe) | $\theta k$ (°) | Square-shape of Kerr hysteresis |
| --- | --- | --- | --- | --- |
| 10 | $Nd_{19}Tb_{32}Fe_{38}Co_{11}$ | 0.45 | 0.03 | x |

In the above case, Kerr hysteresis loop did not exhibit favorable square-shape.

EXAMPLES 9-10

Using composite targets with chips of Nd and Tb arranged in the predetermined proportions on Fe target as targets, films with a magnetization with easy axis perpendicular to the film of Nd—Tb—Fe ternary alloy film different in composition were deposited on glass substrates. The films were formed on the substrates maintained at 20°-30° C. by cooling it with water, while applying a bias voltage of −30 V to the substrate and adopting the sputtering method under argon pressure of 10 m Torr.

Composition of film, coercive force Hc (KOe), kerr-rotation angle $\theta k$(°) and square-shape of Kerr hysteresis of the magnetooptical recording media were measured.

The results obtained are shown in Table 8.

TABLE 8

| Example | Composition of film | Hc (KOe) | $\theta k$ (°) | Square-shape of Kerr hysteresis |
| --- | --- | --- | --- | --- |
| 9 | $Nd_{16}Td_{22}Fe_{62}$ | 2.5 | 0.20 | ○ |
| 10 | $Nd_{15}Tb_{22}Fe_{61}$ | 2.0 | 0.15 | ○ |

COMPARATIVE EXAMPLES 11-13

Following substantially the same procedure as described in Example 9, Nd—Tb—Fe alloy films with Nd/Fe > ½ were deposited on substrate.

Composition of each of the films obtained and magnetooptical characteristics thereof are shown in Table 9.

TABLE 9

| Comparative Example | Composition of film | Hc (KOe) | $\theta k$ (°) | Square-shape of Kerr hysteresis |
| --- | --- | --- | --- | --- |
| 11 | $Nd_{28}Td_{19}Fe_{53}$ | — | — | x |
| 12 | $Nd_{27}Tb_{22}Fe_{51}$ | — | — | x |
| 13 | $Nd_{26}Tb_{24}Fe_{50}$ | — | — | x |

EXAMPLE 11

Using a composite target with chips of Nd and Dy arranged in the predetermined proportions on Fe target as a target, a film with a magnetization with easy axis perpendicular to the film composed of Nd—Dy—Fe ternary alloy film was deposited on a glass substrate. The film was formed on the substrate maintained at 20°-30° C. by cooling with water, while applying a bias voltage of −30 V to the substrate and adopting the sputtering method under argon pressure of 10 m Torr.

Composition of film, coercive force Hc(KOe), kerr-rotation angle $\theta k$(°) and square-shape of Kerr hysteresis loop of the magnetooptical recording medium was measured.

The results obtained are shown in Table 10.

TABLE 10

| Example | Composition of film | Hc (KOe) | $\theta k$ (°) | Square-shape of Kerr hysteresis |
| --- | --- | --- | --- | --- |
| 11 | $Nd_{14}Dy_{23}Fe_{63}$ | 1.1 | 0.20 | ○ |

EXAMPLE 12

Using a composite target with chips of Nd, Dy and Co arranged in the predetermined proportion on Fe target as a target, a film with a magnetization with easy axis perpendicular to the film composed of Nd—Dy—Fe—Co quaternary alloy film on a glass substrate. The film was formed on the substrate maintained at 20°-30° C. by cooling it with water, while applying a bias voltage of −30 V to the substrate and adopting the sputtering method under argon pressure of 10 m Torr.

Composition of film, coercive force Hc(KOe), kerr-rotation angle $\theta k$(°) and square-shape of Kerr hysteresis loop of the magnetooptical recording medium were measured.

The results obtained are shown in Table 11.

TABLE 11

| Example | Composition of film | Hc (KOe) | θk (°) | Square-shape of Kerr hysteresis |
|---|---|---|---|---|
| 12 | $Nd_{12}Dy_{17}Fe_{57}Co_{14}$ | 1.5 | 0.27 | ○ |

EXAMPLE 13

Using a composite target with chips of Nd, Ho and Co arranged in the predetermined proportion on Fe target as a target, a film with a magnetization with easy axis perpendicular to the film composed of Nd—Ho—Fe—Co quaternary alloy film was deposited on a glass substrate. The film was formed on the substrate maintained at 20°-30° C. by cooling it with water, while applying a bias voltage of −30 V to the substrate and adopting the sputtering method under argon pressure of 10 m Torr.

Composition of film, coercive force Hc (KOe), kerr-rotation angle θk(°) and square-shape of Kerr hysteresis loop of the mangetooptical recording medium were measured.

The results obtained are shown in Table 12.

TABLE 12

| Example | Composition of film | Hc (KOe) | θk (°) | Square-shape of Kerr hysteresis |
|---|---|---|---|---|
| 13 | $Nd_{12}Ho_{17}Fe_{57}Co_{14}$ | 1.0 | 0.27 | ○ |

COMPARATIVE EXAMPLE 14

Using a composite target with chips of Nd arranged in the predetermined proportion on Fe target as a target, Nd—Fe alloy film was deposited on a glass substrate maintained at 20°-30° C. by cooling it with water in the same manner as in Example 6.

It was confirmed using a vibrating sample magnetometer (VSM) that in the Nd—Fe alloy film, the magnetic easy axis was in the direction parallel to the film.

COMPARATIVE EXAMPLE 15

Using a composite target with chips of Nd and Co arranged in the predetermined proportions on Fe target as a target, Nd—Fe—Co alloy film was deposited on a glass substrate maintained at 20°-30° C. by cooling it with water, in the same manner as in Example 6.

It was confirmed using a vibrating sample magnetometer (VSM) that in the Nd—Fe—Co alloy film obtained, the magnetic easy axis was in the direction parallel to the film.

What is claimed is:

1. A magnetooptical recording medium, characterized in that said recording medium comprises a film of Nd—Dy—Co alloy system having a magnetic easy axis perpendicular to the film, the composition of said film being represented by the formula $Nd_xDy_yCo_z$ wherein $x/x+y+z$ (atomic ratio) is 0.01–0.2, $y/x+y+z$ (atomic ratio) is 0.1–0.3, and $x/y$ (atomic ratio) is less than 1.

2. A magnetooptical recording medium, characterized in that said recording medium comprises a film of Nd—M—Fe alloy system, in which M denotes Tb, Dy or Ho, having a magnetic easy axis perpendicular to the film, the composition of said film being represented by the formula $Nd_xM_yFe_z$ wherein $x/z$ (atomic ratio) is less than 0.5, $y/x+y+z$ (atomic ratio) is 0.1–0.3, and $x/y$ (atomic ratio) is less than 1.

3. The magnetooptical recording medium according to claim 2 wherein the composition of the film of Nd—M—Fe alloy system is represented by the formula $Nd_xM_yFe_z$ wherein $x/x+y+z$ (atomic ratio) is 0.1 to less than 0.25 and M is Dy or Ho.

4. The magnetooptical recording medium according to claim 2 wherein the composition of the film of Nd—M—Fe alloy system is represented by the formula $Nd_xM_yFe_z$ wherein $x/x+y+z$ (atomic ratio) is 0.05 to less than 0.25 and M is Tb.

5. A magnetooptical recording medium, characterized in that said recording medium comprises a film of Nd—M—Fe—Co alloy system, in which M denote Tb, Dy or Ho, having a magnetic easy axis perpendicular to the film, the composition of said film being represented by the formula $Nd_xM_yFe_zCo_m$ wherein $x/z+m$ (atomic ratio) is less than 0.5, $y/x+y+z+m$ (atomic ratio) is 0.1–0.3, and $x/y$ (atomic ratio) is less than 1.

6. The magnetooptical recording medium according to claim 5 wherein the composition of the film of Nd—M—Fe—Co alloy system is represented by the formula $Nd_xM_yFe_zCo_m$ wherein $x/x+y+z$ (atomic ratio) is 0.1 to less than 0.25 and M is Dy or Ho.

7. The magnetooptical recording medium according to claim 5 wherein the composition of the film of Nd—M—Fe—Co alloy system is represented by the formula $Nd_xM_yFe_zCo_m$ wherein $x/x+y+z$ (atomic ratio) is 0.05 to less than 0.25 and M is Tb.

8. A process for producing a magnetooptical recording medium comprising depositing a film of Nd—Dy—Co alloy system represented by the formula $Nd_xDy_yCo_z$ wherein $x/x+y+z$ (atomic ratio) is 0.01–0.2, $y/x+y+z$ (atomic ratio) is 0.1 to less than 0.3, and $x/y$ (atomic ratio) is less than 1 on a substrate, while maintaining the substrate at a temperature below 150° C.

9. A process for producing a magnetooptical recording medium comprising depositing a film of Nd—M—Fe alloy system represented by the formula $Nd_xM_yFe_z$ wherein M denotes Tb, Dy, or Ho, $x/y$ (atomic ratio) is less than 0.5, $y/x+y+z$ (atomic ratio) is 0.1 to less than 0.3, and $x/y$ (atomic ratio) is less than 1 on a substrate, while maintaining the substrate at a temperature below 150° C.

10. The process for producing a magnetooptical recording medium according to claim 9 wherein the composition of the film of Nd—M—Fe alloy system is represented by the formula $Nd_xM_yFe_z$ wherein $x/x+y+z$ (atomic ratio) is 0.1 to less than 0.25 and M is Dy or Ho.

11. The process for producing a magnetooptical recording medium according to claim 9 wherein the composition of the film of Nd—M—Fe alloy system is represented by the formula $Nd_xM_yFe_z$ wherein $x/x+y+z$ (atomic ratio) is 0.05 to less than 0.25 and M is Tb.

12. A process for producing a magnetooptical recording medium comprising depositing a film of Nd—M—Fe—Co alloy system represented by the formula $Nd_xM_yFe_zCo_m$ wherein M denotes Tb, Dy or Ho, $x/z+m$ (atomic ratio) is less than 0.5, $y/x+y+z+m$ is 0.1 to less than 0.3, and $x/y$ (atomic ratio) is less than 1 on a substrate while maintaining said substrate at a temperature below 150° C.

13. The process for producing a magnetooptical recording medium according to claim 12 wherein the composition of the film of Nd—M—Fe—Co alloy system is represented by the formula $Nd_xM_yFe_zCo_m$ wherein $x/x+y+z+m$ (atomic ratio) is 0.1 to less than 0.25 and M is Dy or Ho.

14. The process for producing a magnetooptical recording medium according to claim 12 wherein the composition of the film of Nd—M—Fe—Co alloy system is represented by the formula $Nd_xM_yFe_zCo_m$ wherein $x/x+y+z+m$ (atomic ratio) is 0.05 to less than 0.25 and M is Tb.

15. The magnetooptical recording medium of claim 1 wherein $x/x+y+z$ (atomic ratio) is from 0.05 to 0.18.

16. The magnetooptical recording medium of claim 2 wherein $x/z$ (atomic ratio) is from 0.1 to 0.4.

17. The process of claim 8 wherein the film is deposited on the substrate while maintaining the substrate at a temperature of from about 20° to 30° C.

18. The process of claim 9 wherein the film is deposited on the substrate while maintaining the substrate at a temperature of from about 20° to 30° C.

19. The process of claim 12 wherein the film is deposited on the substrate while maintaining the substrate at a temperature of from about 20° to 30° C.

20. The magnetooptical recording medium of claim 1 wherein said film of Nd—Dy—Co alloy system has a composition represented by the formula $Nd_{11}Dy_{26}Co_{63}$, $Nd_9Dy_{23}Co_{68}$, $Nd_{11}Dy_{20}Co_{69}$, $Nd_{12}Dy_{22}Co_{67}$ or $Nd_6Dy_{26}Co_{68}$.

21. The magnetooptical recording medium of claim 5 wherein said film of Nd—M—Fe—Co alloy system has a composition represented by the formula $Nd_{19}Tb_{21}Fe_{43}Co_{18}$, $Nd_{19}Tb_{22}Fe_{43}Co_{16}$ or $Nd_{19}Tb_{23}Fe_{44}Co_{14}$.

22. The magnetooptical recording medium of claim 2 wherein said film of Nd—M—Fe alloy system has a composition represented by the formula $Nd_{16}Tb_{22}Fe_{62}$ or $Nd_{15}Tb_{22}Fe_{61}$.

23. The magnetooptical recording medium of claim 2 wherein said film of Nd—M—Fe alloy system has a composition represented by the formula $Nd_{14}Dy_{23}Fe_{63}$.

24. The magnetooptical recording medium of claim 5 wherein said film of Nd—M—Fe—Co alloy system has a composition represented by the formula $Nd_{12}Dy_{17}Fe_{57}Co_{14}$ or $Nd_{12}Ho_{17}Fe_{57}Co_{14}$.

* * * * *

UNITED STATES PATENT AND TRADEMARK OFFICE
CERTIFICATE OF CORRECTION

PATENT NO. : 5,053,287
DATED : October 1, 1991
INVENTOR(S) : MIZUMOTO et al.

It is certified that error appears in the above-identified patent and that said Letters Patent is hereby corrected as shown below:

Title page, item [75], change
"Hirokazu Kejiura" to --Hirokazu Kajiura--.
Title page, item
[30] Foreign Application Priority Data:

Please change the second Japanese Patent Application Number, "61-296689" to --61-196689--, and the third Japanese Patent Application Number, "62-2384" to --62-23834--.

Signed and Sealed this

First Day of June, 1993

Attest:

MICHAEL K. KIRK

*Attesting Officer*    Acting Commissioner of Patents and Trademarks